(12) United States Patent
Chang et al.

(10) Patent No.: US 10,593,023 B2
(45) Date of Patent: Mar. 17, 2020

(54) DEEP-LEARNING-BASED AUTOMATIC SKIN RETOUCHING

(71) Applicant: ADOBE INC., San Jose, CA (US)

(72) Inventors: Huiwen Chang, Princeton, NJ (US); Jingwan Lu, Santa Clara, CA (US)

(73) Assignee: Adobe Inc., San Jose, CA (US)

( * ) Notice: Subject to any disclaimer, the term of this patent is extended or adjusted under 35 U.S.C. 154(b) by 89 days.

(21) Appl. No.: 15/895,759

(22) Filed: Feb. 13, 2018

(65) Prior Publication Data

US 2019/0251674 A1 Aug. 15, 2019

(51) Int. Cl.
*G06T 5/00* (2006.01)
*G06K 9/62* (2006.01)
*G06N 3/02* (2006.01)

(52) U.S. Cl.
CPC ............ *G06T 5/005* (2013.01); *G06K 9/6264* (2013.01); *G06N 3/02* (2013.01); *G06T 5/007* (2013.01)

(58) Field of Classification Search
CPC ................ A61B 18/1233; A61B 18/14; A61B 2017/00075; A61B 2018/00452; A61B 2018/0047; A61B 2018/00642; A61B 2018/00648; A61B 2018/00702; A61B 2018/00791; A61B 2018/00797; A61B 2018/00875; A61B 2018/00898; A61B 2018/00994; A61B 2018/1807; A61B 2090/065; A61B 5/442; A61B 5/444;
(Continued)

(56) References Cited

U.S. PATENT DOCUMENTS 5,138,924 A * 8/1992 Ohya ...................... G10H 7/00
706/17
6,072,496 A * 6/2000 Guenter ............. G06K 9/00201
345/419

(Continued)

OTHER PUBLICATIONS

Bharbi, M., Chen, J., Barron, J. T., Hasinoff, S. W., & Durand, F. (2017). Deep bilateral learning for real-time image enhancement. ACM Transactions on Graphics (TOG), 36(4), 118. Jul. 10, 2017.*

(Continued)

*Primary Examiner* — Aklilu K Woldemariam
(74) *Attorney, Agent, or Firm* — Shook, Hardy & Bacon, L.L.P.

(57) ABSTRACT

Embodiments disclosed herein involve techniques for automatically retouching photos. A neural network is trained to generate a skin quality map from an input photo. The input photo is separated into high and low frequency layers which are separately processed. A high frequency path automatically retouches the high frequency layer using a neural network that accepts the skin quality map as an input. A low frequency path automatically retouches the low frequency layer using a color transformation generated by a second neural network and the skin quality map. The retouched high and low frequency layers are combined to generate the final output. In some embodiments, a training set for any or all of the networks is enhanced by applying a modification to an original image from a pair of retouched photos in the training set to improve the resulting performance of trained networks over different input conditions.

20 Claims, 5 Drawing Sheets
(1 of 5 Drawing Sheet(s) Filed in Color)

(58) Field of Classification Search
CPC ....... A61B 5/445; A61B 5/443; A61B 5/0531;
A61B 5/4312; A61B 5/489; A61B
5/7225; A61B 5/7425; A61B 8/0825;
A61B 8/4281; A61B 8/4416; A61B
8/4444; A61B 8/4477; A61B 8/4483;
A61B 8/4494; A61B 8/463; A61B
8/5207; A61B 8/5215; A61B 8/5261;
A61B 8/5292; A61N 1/403; A61N
2007/0034; A61N 7/00; A61N 7/02;
H01L 2924/00014; G06T 2207/30088;
G06T 7/0012; G06T 11/60; G06T 1/0007;
G06T 5/005; G06T 11/003; G06T
2207/10024; G06T 2207/10132; G06T
5/002; G06T 7/11; G06T 7/30; G06K
9/52; G06K 9/4652; G06K 9/6269; G06K
9/00671; G06K 9/00268; G06K 9/4642;
G06K 2009/00932; G06K 9/00885; A45D
2044/007; H04N 13/395; H04N 13/371;
H04N 19/61; H04N 19/63; G02B
27/0093; G02B 2027/0138; G06F 3/016;
G06F 3/014; G10H 2250/311
USPC ......... 382/115, 128, 131, 274, 607; 348/241
See application file for complete search history.

(56) References Cited

U.S. PATENT DOCUMENTS

| | | | | |
|---|---|---|---|---|
| 7,512,180 | B2* | 3/2009 | Florencio | H04N 19/63 375/240.12 |
| 9,747,719 | B2* | 8/2017 | Dehais | G06T 17/20 |
| 2009/0028423 | A1* | 1/2009 | Sandstrom | G01N 21/956 382/149 |
| 2009/0245603 | A1* | 10/2009 | Koruga | A45D 44/00 382/128 |
| 2010/0185064 | A1* | 7/2010 | Bandic | A61B 5/0059 600/306 |
| 2011/0077451 | A1* | 3/2011 | Marchitto | A61B 18/14 600/13 |
| 2011/0199511 | A1* | 8/2011 | Takahashi | H04N 1/00198 348/231.5 |
| 2012/0253224 | A1* | 10/2012 | Mir | A61B 5/441 600/556 |
| 2013/0321672 | A1* | 12/2013 | Silverstein | H04N 5/365 348/241 |
| 2014/0016832 | A1* | 1/2014 | Kong | A61B 5/1171 382/115 |
| 2014/0185899 | A1* | 7/2014 | Zalev | A61B 5/0095 382/131 |
| 2015/0016721 | A1* | 1/2015 | Min | G06K 9/00234 382/167 |
| 2015/0206022 | A1* | 7/2015 | Radha Krishna Rao | G06K 9/4604 382/128 |
| 2016/0205273 | A1* | 7/2016 | Suzuki | H04N 1/62 358/3.27 |

OTHER PUBLICATIONS

Boyadzhiev, I., Bala, K., Paris, S., & Adelson, E. (2015). Band-sifting decomposition for image-based material editing. CM Transactions on Graphics (TOG), 34(5), 163., Oct. 15, 2015.*

Boyadzhiev, I., Bala, K., Paris, S., & Adelson, E. (2015). Band-sifting decomposition for image-based material editing. ACM Transactions on Graphics (TOG), 34(5), 163.

Chang, H., Fried, O., Liu, Y., DiVerdi, S., & Finkelstein, A. (2015). Palette-based photo recoloring. ACM Transactions on Graphics (TOG), 34(4), 139.

Gharbi, M., Chen, J., Barron, J. T., Hasinoff, S. W., & Durand, F. (2017). Deep bilateral learning for real-time image enhancement. ACM Transactions on Graphics (TOG), 36(4), 118.

Shu, Z., Hadap, S., Shechtman, E, Sunkavalli, K., Paris, S., & Samaras, D. (2017). Portrait lighting transfer using a mass transport approach. ACM Transactions on Graphics (TOG), 36(4), 145a.

Yu, F., Koltun, V., & Funkhouser, T. (May 2017). Dilated residual networks. In Computer Vision and Pattern Recognition (vol. 1).

* cited by examiner

DEEP-LEARNING-BASED AUTOMATIC SKIN RETOUCHING

BACKGROUND

Research and commercial software offer a myriad of tools for novices, photographers and other professionals to perfect regions of skin in a photograph (i.e., photo). For example, skin retouching is routinely applied in the fashion and photography industries. However, existing professional tools require sophisticated editing steps.

For example, professional photographers tend to use a combination of manual operations in photo editing applications such as ADOBE PHOTOSHOP® for skin retouching. These operations can include performing frequency separation, using clone tools, patch tools and the like, and then manually applying different parameters to different frequency layers. There are many instructional videos that teach users how to perform such manual skin retouching. Careful and precise manual retouching can lead to realistic results. However, it often takes a professional user 5-10 minutes of manual effort to achieve such results for a given photo, depending on skin quality in the original photo. Such a process is tedious and time consuming, resulting in an unsatisfactory process. Moreover, manual retouching is often beyond the skill level of most casual users.

SUMMARY

Embodiments of the present invention are directed to facilitating automatic retouching of photographs such as portraits, and more particularly, automatic retouching of the subject's skin. Generally, an input image such as a portrait photo is separated into high and low frequency layers, each of which is processed by a separate neural network. The high frequency path advantageously segments the high frequency layer into a plurality of patches, each of which is automatically retouched by a neural network in the high frequency path and recombined using alpha blending. The low frequency path includes a separate neural network trained to predict coefficients for a color transformation applied to automatically retouch the low frequency layer. In some embodiments, the neural network in the high frequency layer is a conditional generative adversarial network using a deep learning architecture, and the neural network in the low frequency layer is a dilated residual network using a deep learning architecture. These automatically retouched high and low frequency layers are combined to generate an automatically retouched image.

To assist the first and second neural networks, a skin quality map can be generated using another neural network. A training set can be generated from pairs of retouched photos, before and after retouching (e.g., original photos with blemishes paired with corresponding manually retouched photos). By subtracting an original photo from a corresponding retouched photo (e.g., on a per-pixel basis), the resulting difference can quantify the amount of retouching that was performed. The larger the difference, the more likely it is that the corresponding region of the original photo indicates a region of relatively poor skin quality. The differences for each analyzed region are used to generate a skin quality map, optionally using a normalized scale. The original photo from each pair along with the corresponding skin quality map can be used to train the neural network to generate a skin quality map for an input image. This skin quality map can be used as an input to the first neural network in the high frequency path, and can be used to upsample the color transformation applied in the low frequency path, to automatically retouch the input image.

Various data augmentation techniques can be applied to enhance a training set of retouched photo pairs, in order to reduce the need for a larger training set and to improve the resulting performance of trained networks over different input conditions. For example, original photos from the training set can be modified by applying relighting techniques, simulating various levels of synthetic blemishes, cropping to different sizes, applying palette-based photo recoloring to change skin tones in the input photos, and the like. Meanwhile, the retouched photos from the training set remain unchanged. As such, the resulting enhanced training set of retouched photo pairs can be used to train any or all of the neural networks to generalize the networks, for example, to handle input images with arbitrary lighting, to improve the network's ability to remove blemishes, to generalize the network for various sized photos, to generalize the network to handle various skin tones, and the like.

As such, using techniques disclosed herein, a user can efficiently and effectively retouch a designated photo automatically. For example, techniques disclosed herein can automatically detect blemishes, preserve skin detail, and avoid over-smoothing, compared with conventional systems for automatically retouching a photograph. Moreover, the present automatic retouching techniques reduce the computation time when compared to the time it takes conventional systems to accomplish lesser results. Accordingly, the disclosed techniques can provide creative professionals and casual users alike with a new, automated retouching tool that produces professional quality results significantly faster than conventional editing tools.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The present invention is described in detail below with reference to the attached drawing figures, wherein.

DETAILED DESCRIPTION

Overview

Figure 1:
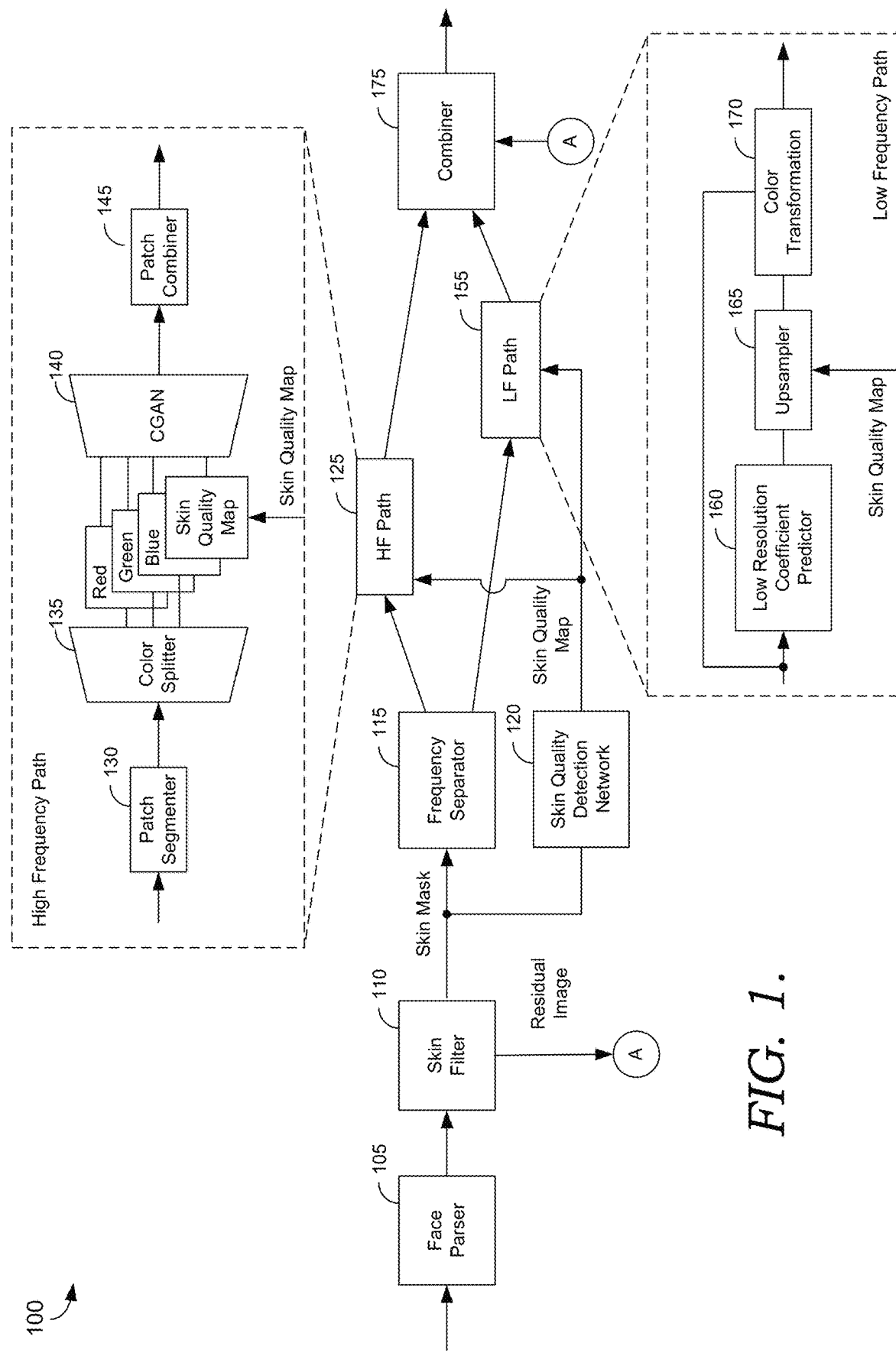
FIG. 1 is a block diagram of an exemplary automatic retouching tool, in accordance with embodiments of the present invention.

Conventional systems for automatically retouching skin have various drawbacks. For example, some software applications use face parsing technology to automatically separate regions of skin for processing. As such, some automatic photo editing applications for mobile devices (i.e., apps) use face parsing technology to offer casual users access to automatic skin smoothing. However, such conventional automatic skin smoothing can over-smooth skin and other important facial features, resulting in unsatisfactory results. Recent advances in face parsing technology can prevent the smoothing of certain facial features such as eyes, eyebrows and lips, but cannot prevent smoothing of other facial features which can be important for identity recognition, such as men's facial hair, stubble, wrinkle lines (e.g., laugh lines) and the like.

As an alternative to face parsing technology, some mobile apps such as ADOBE PHOTOSHOP FIX, PHOTOWONDER, FACETUNE, PICMONKEY and MEITU allow casual users to digitally retouch skins by requiring users to manually locate blemishes. Once a user manually identifies specific regions of skin by hand, these mobile apps perform automatic filtering operations within these specific, fixed regions. However, these mobile apps generally do not apply transitional smoothing techniques. As such, pixels of skin from the filtered regions often do not blend with the rest of the face (i.e., the unfiltered parts of the face).

Some commercial apps provide a one-click fix feature with a dial for adjusting smoothness levels. However, a high level of smoothing tends to over-smooth skin details, while a low level of smoothing is usually insufficient to remove severe blemishes. The results from these commercial apps may be adequate for casual viewing on a mobile device, but are generally not a high enough quality for professional use.

Recent research in automatic skin retouching involves decomposing an image into multiple subbands, and modifying coefficients within the subbands (band-sifting) to modify skin appearance. See Boyadzhiev, Bala, Paris & Adelson, *Band-Sifting Decomposition for Image Based Material Editing*, ACM Transactions on Graphics (2015). While these adjustments can operate to modify skin features such as oiliness and blemishes, this approach does not intend to—and cannot—remove heavy blemishes.

Accordingly, embodiments of the present invention are directed to a supervised learning technique whereby separate neural networks are trained to automatically retouch respective high and low frequency layers of an input image such as a photo. At a high level, a portrait or other photo to be retouched can be decomposed into high and low frequency layers. The high frequency layer contains the skin texture details and small blemishes, while the low frequency layer includes skin tone, shading and shadow information. As such, automatic skin retouching can be decomposed into separate high and low frequency operations. The high frequency operations can be understood as a texture synthesis problem, automatically retouching without losing important skin detail. Operations in the low frequency layer can be understood as a color transformation problem. Separate neural networks are trained to automatically perform the automatic retouching in each layer, and the resulting network outputs from the two frequency layers are combined to produce the final output.

To assist the high and low frequency networks, a skin quality detection neural network is trained to detect skin quality. For example, a neural network can be trained to locate blemishes, wrinkles and oily regions and generate a corresponding skin quality map. The skin quality map can be a probability map comprising a probability for each analyzed pixel that the pixel should be retouched (e.g., contains a blemish, wrinkle, oily skin, etc.). The skin quality detection network can be trained using the same training set as that used to train the high and low frequency networks. For example, the training set can be generated from pairs of retouched photos, before and after retouching (e.g., original photos with blemishes paired with corresponding manually retouched photos). As explained in more detail below, the skin quality map can be provided as inputs into the high and low frequency operations.

In some embodiments, data augmentation methods can be applied to augment a training set of retouched photo pairs, in order to reduce the need for a larger training set and to improve the resulting performance of trained networks over different input conditions. As a general matter, the more training performed over a range of desired input conditions, the better the expected performance. To reduce the need for a relatively larger training set, an existing training set of retouched photo pairs can be enhanced by modifying an original photo from a given pair before training. For example, original photos from the training set can be modified by applying relighting techniques, simulating various levels of synthetic blemishes, cropping to different sizes, applying palette-based photo recoloring to change the skin tones in the input photos, and the like. Meanwhile, the retouched photos from the training set remain unchanged. As such, the resulting enhanced training set of retouched photo pairs can be used to train any or all of the neural networks to generalize the networks, for example, to handle input images with arbitrary lighting, to improve the network's ability to remove blemishes, to generalize the network for various sized photos, to generalize the network to handle various skin tones, and the like.

As such, using implementations described herein, a user can efficiently and effectively perform automatic skin retouching in a manner that automatically detects blemishes, preserves skin detail and avoids over-smoothing. Moreover, the resulting automatic skin retouching technique reduces the computation time required for conventional systems to automatically retouch skin. In this manner, the disclosed techniques can provide creative professionals and casual users alike with a new, automated retouching tool that produces professional quality results significantly faster than conventional editing tools.

Having briefly described an overview of aspects of the present invention, various terms used throughout this description are provided. Although more details regarding various terms are provided throughout this description, general descriptions of some terms are included below to provider a clearer understanding of the ideas disclosed herein:

Retouching generally refers to a photo editing process that corrects undesirable features within a photo. Retouching has traditionally been a manual process where photographers or other creative professionals edit photographs to produce desired results. For example, with respect to portraits, photographers in the fashion and photography industries can manually retouch photos using various editing techniques to shrink pores, reduce acne, reduce an oily skin appearance, and even manually eliminate some heavy blemishes. As used herein, automated techniques to achieve these and other photo editing results are referred to as automatic retouching.

The term skin mask (or more generally an image mask) is used herein to refer to a filtered image having certain regions removed (i.e., filtered out), leaving only those having been identified for analysis and retouching. For example, in some embodiments, a face parser is applied to a portrait to identify various parts of a face (e.g., forehead, nose, cheeks, etc.). A skin filter can be applied to remove the non-skin regions (e.g., background, hair, eyes, etc.) from the image, producing a skin mask. The regions of the photo that were removed is referred to herein as the residual image.

A skin map (or more generally an image map) is a data structure which provides information about relevant regions of a photo. For example, a face parser can be applied to a portrait to identify the regions of skin to be processed for retouching, and the identified regions can be used to generate a map that identifies these regions for editing (e.g., on a pixel-by-pixel basis). As such, an original photo can be annotated or otherwise associated with a skin map.

One particular type of a skin map is a skin quality map (or more generally an image quality map). A skin quality map is a data structure which provides skin quality information about each analyzed region of a photo. As explained below, a skin quality detection network can be trained to locate blemishes, wrinkles and oily regions in a photo and assign a corresponding value (e.g., a probability) to each analyzed region (e.g., each pixel) to provide an indication of skin quality in that region. As such, the skin quality map can be used to indicate which regions (e.g., which pixels) need to be retouched, or are more likely to need retouching (e.g., may contain a blemish, wrinkle, oily skin, etc.).

Exemplary Automatic Skin Retouching Environment

Referring now to FIG. 1, FIG. 1 depicts a block diagram of exemplary automatic retouching tool 100. Generally, automatic retouching tool 100 facilitates photo retouching, and, among other things, facilitates automatic retouching of photographs such as portraits, and more particularly, facilitates automatic retouching of the subject's skin. Generally, automatic retouching tool 100 can be implemented, wholly or in part, on a user device. The user device can be any kind of computing device capable of facilitating photo retouching. For example, in an embodiment, the user device can be a computing device such as computing device 500, as described below with reference to FIG. 5. In embodiments, the user device can be a personal computer (PC), a laptop computer, a workstation, a mobile computing device, a PDA, a cell phone, or the like.

As such, an exemplary environment may include a user device having access to automatic retouching tool 100, which may be incorporated into, integrated into, or otherwise accessible by an application or an add-on or plug-in to an application installed or otherwise accessible by the user device. For example, such an application may generally be any application capable of facilitating photo retouching. The photo retouching application may be a stand-alone application, a mobile application, a web application, or the like. In some implementations, the photo retouching application(s) comprises a web application, which can run in a web browser, and could be hosted at least partially server-side. In addition, or instead, the photo retouching application(s) can comprise a dedicated application. In some cases, the application can be integrated into the operating system (e.g., as a service). One exemplary application that may be used for photo retouching is ADOBE PHOTOSHOP. Although generally discussed herein as automatic retouching tool 100 being associated with an application, in some cases, automatic retouching tool 100, or portion thereof, can be additionally or alternatively integrated into the operating system of a user device (e.g., as a service) or a server (e.g., a remote server). In embodiments where at least a portion of automated retouching tool 100 is accessible to a user device from a remote location, the user device may interact with a corresponding component (e.g., a remote server) via a network, which may include, without limitation, one or more local area networks (LANs) and/or wide area networks (WANs). Such networking environments are commonplace in offices, enterprise-wide computer networks, intranets, and the Internet.

At a high level, automatic retouching tool 100 performs digital image processing of a specified input such as a designated photograph. For example, a user may upload, select or otherwise designate a photograph or other image for automatic retouching (e.g., via an interface component of retouching tool 100). In some embodiments, automatic retouching tool 100 is tailored to automatically retouch a specific type of photograph such as a portrait. Although embodiments herein refer to automatic retouching of a portrait, the techniques disclosed herein can be applied to tailor automatic retouching tool 100 to retouch any type of image or photograph, as would be understood by those of ordinary skill in the art.

In the embodiment depicted in FIG. 1, automatic retouching tool 100 includes face parser 105, skin filter 110, frequency separator 115, skin quality detection network 120, high frequency path 125, low frequency path 155, and combiner 175. At a high level, face parser 105 automatically identifies the face of the subject of a designated photograph. Skin filter 110 filters out all non-skin regions to produce a skin mask and a residual image. The skin mask comprises the regions of the designated photograph with the subject's skin. The residual image is the region of the photograph that has been filtered out, namely, any non-skin regions. The skin mask is used as an input into skin quality detection network 120 and frequency separator 115. Skin quality detection network 120 is a neural network, such as a convolutional neural network, trained to generate a skin quality map from the skin mask. The skin quality map can be a probability map that indicates a probability that a particular region of the skin mask (e.g., each pixel or collection of pixels) is likely to need retouching (e.g., may contain a blemish, wrinkle, oily skin, etc.). The skin quality map is fed into both high and low frequency paths 125 and 155 as an input.

Returning to the skin mask produced by skin filter 110, the skin mask is fed into frequency separator 115, which separates the skin mask into a high frequency layer and a low frequency layer. Generally, the high frequency layer contains the skin texture details and small blemishes, while the low frequency layer contains skin tone, shading and shadow information. As illustrated in FIG. 1, the high and low frequency layers are processed using high frequency path 125 and low frequency path 155, respectively. Each of high and low frequency paths 125 and 155 advantageously utilizes a supervised deep learning technique whereby a corresponding deep neural network in each path is trained to automatically retouch a respective layer of the skin mask, using the skin quality map as an input. More specifically, high frequency layer 125 utilizes a conditional generative adversarial network to automatically retouch the high frequency layer. Low frequency layer 155 utilizes a neural network trained to generate a bilateral grid comprising a color transformation for low resolution image pixels. The bilateral grid containing the color transformation is upsampled using the skin quality map, and the upsampled color transformation is applied to automatically retouch the low frequency layer of the skin mask. The automatically retouched high and low frequency layers are fed into combiner 175, along with the residual image from skin filter 110, to reconstitute the high and low frequency layers and the residual image into a retouched photo.

Returning now to the front end of automatic retouching tool 100, face parser 105 is generally configured to receive or otherwise access a designated photograph for retouching, such as a portrait. For example, a user may upload or otherwise indicate the location of a portrait or other photo, for example, via an interface component of retouching tool 100, a corresponding application, or the like. Generally, face parser 105 processes an input photo to automatically detect regions of the photo that include a subject's skin. For example, face parser 105 can analyze an input photo to automatically identify the various parts of a subject's face, such as the eyes, nose, mouth, chin, forehead, ears, and the like. As such, face parser 105 can label or otherwise identify any or all of the detected parts. For example, face parser 105 may annotate the original photo with one or more annotations that identify the regions of the photo that include a subject's skin (e.g., forehead, nose, cheeks, etc.). In some embodiments, face parser 105 can identify the detected skin regions using one or more data structures, which can be accessed by subsequent components such as skin filter 110. Face parsing technology is generally known in the art, the details of which will be understood by those of ordinary skill in the art.

Additionally and/or alternatively, a user may designate a photo for which the relevant regions to be analyzed for retouching (e.g., skin regions) have already been annotated or otherwise identified. As such, automatic retouching tool 100 need not include face parser 105, may bypass face parser 105, or may confirm the locations of the previously identified skin regions. More generally, in embodiments that automatically retouch other types of photos, face parser 105 may be replaced with another image processing tool which can annotate or otherwise identify desired regions of the photo to be analyzed for retouching.

In some embodiments, skin filter 110 accepts or otherwise accesses the designated photo and the identified skin regions, and filters out the non-skin regions (e.g., background, hair, eyes, etc.). In this embodiment, skin filter 110 produces two outputs: a skin mask comprising the identified and filtered skin regions, and a residual image comprising the remaining portions of the relevant image. In some embodiments, the skin regions need not be isolated. Rather, components of automatic retouching tool 100 can operate on the identified regions using the annotations or other data structure identifying the relevant regions. As such, in some embodiments, automatic retouching tool 100 does not include skin filter 110, or bypasses it. More generally, in embodiments that automatically retouch other types of photos, skin filter 110 may be replaced with some other filter which can filter out the annotated or otherwise identified regions of the photo to be analyzed for retouching.

Skin quality detection network 120 operates on the skin map to detect skin quality. For example, skin quality detection network 120 can be a neural network trained to detect skin quality from the skin map and generate a skin quality map or other indication of skin quality. Any type of neural network with any suitable architecture may be implemented. In one embodiment, skin quality detection network 120 is a convolutional neutral network using a deep learning architecture. Generally, skin quality detection network 120 is trained to locate blemishes, wrinkles and oily regions. The resulting skin quality map can be a probability map comprising a probability that each analyzed region (e.g., each pixel or collection of pixels) should be retouched (e.g., contains a blemish, wrinkle, oily skin, etc.). In some embodiments, each probability may be represented on a normalized scale, such as [0,1]. Although skin quality detection network 120 is described as operating on a skin mask, in some embodiments, other quality detection networks can be trained to use other inputs, such as an annotated photo or other data structure identifying regions of an photo to be analyzed for retouching.

Skin quality detection network 120 can be trained using a training set generated using any of the techniques described herein. At a high level, a suitable training set may be based on pairs of retouched photos, before and after retouching (e.g., original photos with blemishes paired with corresponding manually retouched photos). Generally, skin quality detection network 120 can be trained to learn the difference between retouched photo pairs. For example, given a particular retouched photo pair, the original photo can be subtracted from the retouched photo to quantify the difference between the photos for each analyzed region (e.g., a particular pixel or collection of pixels). When the difference is high, the corresponding region of the original photo has been retouched, indicating a region of poor skin quality on the original photo. When the difference is zero, the corresponding region of the original photo has not been retouched, indicating a region of acceptable skin quality on the original photo. These differences can be mapped to a normalized range, such as [0,1], to generate a skin quality map for each retouched photo pair. As such, skin quality detection network 120 can be trained using the original image from a retouched photo pair as an input and using the corresponding skin quality map as ground truth. In this manner, skin quality detection network 120 can be trained to generate a skin quality map that identifies a likelihood that any region of skin contains a blemish, wrinkle, oily skin, etc. In some embodiments, skin quality detection network 120 can use a training set based on the same retouched photo pairs used to train the high and low frequency networks described in more detail below. As illustrated in FIG. 1, the skin quality map generated by skin quality detection network 120 is fed into both high and low frequency paths 125 and 155 as an input.

Frequency separator 115 generally separates an input photo into a high frequency layer and a low frequency layer. Such frequency separation is known, the details of which will be understood by those of ordinary skill in the art. In the embodiment illustrated in FIG. 1, frequency separator 115 operates on the skin mask generated by skin filter 110, although in some embodiments, frequency separator 115 can operate on an unfiltered photo. The resulting high frequency layer contains the skin texture details and small blemishes, while the resulting low frequency layer contains skin tone, shading and shadow information. As such, automatic skin retouching can be decomposed into separate high and low frequency operations. The high frequency operations can be understood as a texture synthesis problem, automatically retouching without losing important skin detail. Operations in the low frequency layer can be understood as a color transformation problem. The resulting high and low frequency layers are fed into high and low frequency paths 125 and 155, respectively.

In some embodiments, the frequency separation can produce one or more layers with negative values, for example, if the high frequency layer is generated by subtracting the low frequency layer from the input photo, or vice versa. However, image formats are generally incompatible with negative values. Accordingly, a normalization operation can be performed to adjust the values of an offending layer. Continuing with the nonlimiting example above, subtracting a low frequency layer with range [0,1] from an input photo with range [0,1] can result in a range of [−1,1]. As such, the resulting high frequency layer can be normalized to [0,1] by adding one and dividing by two. Any type of normalization may be performed in accordance with various embodiments. As such, a particular layer can be normalized before subsequent operations are performed on the layer.

High frequency path 125 automatically retouches the high frequency layer, and includes patch segmenter 130, color splitter 135, conditional generative adversarial network 140, and patch combiner 145. Generally, patch segmenter 130 separates the high frequency layer into a number of smaller patches, which are each processed separately and combined using patch combiner 145. Color splitter 135 separates a particular patch into a plurality of color channels (e.g., red/green/blue), each of which is fed into a corresponding channel of conditional generative adversarial network 140. The skin quality map is likewise fed into a channel of conditional generative adversarial network 140. As explained in more detail below, conditional generative adversarial network 140 is trained to use these inputs to automatically retouch each patch. Finally, combiner 145 combines the retouched patches to produce the retouched high frequency layer.

As a general matter, there is often a substantial amount of detail in the high frequency layer for conditional generative adversarial network 140 to evaluate. However, generative neural networks are often ineffective at evaluating substantially high frequencies (e.g., the network is difficult to train, sufficient training data is often lacking, etc.). Moreover, to evaluate an entire face, the corresponding image size must be reduced to a size the network can evaluate. By operating on patches of skin, rather than the entire skin region in a photo, the corresponding image size need not be reduced as much. As a result, the network can focus on relatively more details in each patch, thereby improving the network's performance. As such, patch segmenter 130 can separate the high frequency layer into any number of smaller patches, depending on the application. In one nonlimiting example for retouching portrait photos, patch segmenter 130 can segment the high frequency layer into a grid of patches (e.g., 3×3, n×n, m×n), or any other collection of regions. Advantageously, the patches at least partially overlap with an adjacent patch, and more specifically, with each adjacent patch.

Color splitter 135 separates a particular patch into a plurality of color channels (e.g., red/green/blue), as will be understood by those of ordinary skill in the art. Each of these color channels, along with the skin quality map (or a corresponding patch, thereof), is fed into a corresponding channel of conditional generative adversarial network 140.

Conditional generative adversarial network 140 is trained to automatically retouch patches of skin from the high frequency layer (e.g., evaluating each pixel in a patch, collections of pixels in patch, etc.). Generally, a generative adversarial network contains two networks: a generative network that generates candidates and a discriminative network that evaluates them. In a conditional generative adversarial network, the generative network generates candidates based on a conditional input (e.g., a particular patch of skin to retouch and a corresponding skin quality map). In this manner, the generative network of a conditional generative adversarial network 140 can be trained to retouch each patch of skin. By using a conditional generative adversarial network, the present technique provides sharper and more realistic retouching than those produced using other network frameworks.

The architecture of the generator network can be any suitable architecture. Preferably, the generator is a dilated residual network with degriding layers, the details of which will be understood by those of ordinary skill in the art. Generally, a dilated residual network improves on a conventional convolutional network by expanding or "dilating" the regions of an image that are sampled. By using this dilated convolution technique, a particular image does not need to be downsampled to a lower image resolution. At each layer, each map views a larger portion of the input photo, providing the network with a better understanding of the constituent detail. In this manner, convolution occurring in deeper layers of the network can evaluate relatively larger portions of an input photo. This is in contrast to other techniques in which downsampling during prior layers results in a loss of detail. By dilating the receptive field of the network, the capacity of the network is improved without losing image detail.

Conditional generative adversarial network 140 can be trained using a training set generated using any of the techniques described herein. At a high level, a suitable training set may be based on pairs of retouched photos, before and after retouching (e.g., original photos with blemishes paired with corresponding manually retouched photos). Generally, the generative network of conditional generative adversarial network 140 is trained to utilize an original photo (or patch thereof) from a pair to generate an output that matches the retouched photo (or patch thereof) of the pair. Meanwhile, the discriminator network of conditional generative adversarial network 140 is trained to determine whether the generated output and the retouched photo from the training set are similar (e.g., binary classification). Through training, the generative network learns to generate results that fool the discriminator. As such, conditional generative adversarial network 140 can learn to automatically retouch a particular input. In FIG. 1, conditional generative adversarial network 140 automatically retouches blemishes and wrinkles in each patch of the high frequency layer.

Patch combiner 145 aggregates and recombines the automatically retouched patches of the high frequency. In some embodiments, patch combiner 145 performs a blending operation between patches, such as alpha blending. As such, the output of patch combiner 145, which is also the output of high frequency path 125, is an automatically retouched high frequency layer.

Low frequency path 155 automatically retouches the low frequency layer by applying a transformation in color space to smooth uneven skin tones and eliminate or reduce redness and dark spots. Low frequency path 155 includes low resolution coefficient predictor 160, upsampler 165, and color transformation 170. Generally, low resolution coefficient predictor 160 is a neural network (e.g., a convolutional neural network) trained to generate a color transformation (e.g., per pixel) in RGB color space. Low resolution coefficient predictor 160 can be trained using a training set generated using any of the techniques described herein. At a high level, a suitable training set may be based on pairs of retouched photos, before and after retouching (e.g., original photos with blemishes paired with corresponding manually retouched photos). For example, low resolution coefficient predictor 160 can be trained to generate a color transformation that maps an original photo from the training set to its paired retouched photo. For example, low resolution coefficient predictor 160 can be trained to generate an output comprising a bilateral grid, where each grid is a color transformation for low resolution image pixels, as will be understood by those of ordinary skill in the art. Upsampler 165 upsamples the grid for any resolution. Unlike conventional techniques, upsampler 165 upsamples the bilateral grid using the skin quality map disclosed herein, and color transformation 170 applies the resulting upsampled color transformation to the low frequency layer. As such, the output of color transformation 170, which is also the output of low frequency path 155, is an automatically retouched low frequency layer.

Combiner 175 generally reconstitutes the automatically retouched high and low frequency layers. For example, the automatically retouched high and low frequency layers can be added together. In embodiments in which one or more of the separated layers was normalized (for example, to adjust the values of the layer to avoid negative image values), a corresponding compensation operation can be performed such that reconstituting the retouched layers produces values in a desired range. Continuing with the nonlimiting example above in which the high frequency layer was normalized from [−1,1] to [0,1] by adding one and dividing by two before being fed into high frequency path 125, the automatically retouched high frequency layer can be adjusted back to [−1,1] by multiplying by two and subtracting one so it can be combined with the retouched low frequency layer. As such, a particular retouched layer can be readjusted using a compensation operation before reconstituting the layer.

In embodiments in which the high and low frequency layers were generated based on a skin mask, reconstituting the retouched high and low frequency layers results in a retouched skin mask. As such, combiner 175 reconstitutes the residual image (previously separated out by skin filter 110) with the retouched skin mask to generate a reconstituted retouched photo. As such, the output of combiner 175, which is also the output of automatic retouching tool 100, is an automatically retouched photo.

Turning now to a suitable training set for one or more of the networks described herein, a suitable training set may be based on pairs of retouched photos, before and after retouching (e.g., original photos with blemishes paired with corresponding manually retouched photos). As a general matter, the behavior learned from a particular training set attempts to reproduce the differences between the original photos and their corresponding retouched photos. For example, one or more networks can be trained using a dataset containing advantageously high-resolution retouched photo pairs that reflect various retouched skin blemishes for people with different skin tones and genders. To teach the networks to preserve certain skin features, such as skin detail, pore structures, men's facial hair, certain wrinkles, subtle highlight and shadow distributions important for preserving identities, the retouched photos in the training set advantageously preserve these skin features.

Moreover, it is possible to enhance the performance of a particular network by augmenting the training set. Given a limited amount of training data, data augmentation methods can be applied to augment a training set of retouched photo pairs, in order to reduce the need for a larger training set and to improve the resulting performance of trained networks over different input conditions. As a general matter, the more training performed over a range of desired input conditions, the better the expected performance. To reduce the need for a relatively larger training set, an existing training set of retouched photo pairs can be enhanced by modifying an original photo from a pair before training. Meanwhile, the retouched photos from the training set remain unchanged. As such, the resulting enhanced training set of retouched photo pairs can be used to train a neural network to generalize the network to respond to a wider variety of conditions, such as arbitrary lighting, a wider variety of blemishes, more severe blemishes, various sized input photos, a wider variety of skin tones, and the like.

For example, original photos from the training set can be modified by applying relighting techniques, such as portrait relighting. Where a particular training set does not include a desired variety of lighting conditions (e.g., training photos are well-lit under uniform frontal lighting), relighting can be applied to transfer the lighting conditions in selected examples to modify the original photos from the training set to reflect the desired variety. Additionally and/or alternatively, original photos from the training set can be modified by simulating various levels of synthetic blemishes, as would be understood by those of ordinary skill in the art, to modify the original photos from the training set to include a wider variety of blemishes and/or more severe blemishes. Likewise, original photos from the training set can be modified by cropping the original photos to different sizes, so that a network can be trained to be insensitive to the size of the input photos. Moreover, original photos from the training set can be modified by applying palette-based photo recoloring to change skin tones in the original photos, so that a network can be trained to be insensitive to input skin tones. As such, the performance of a particular network can be enhanced by augmenting the training set used to train the network.

Figure 2:
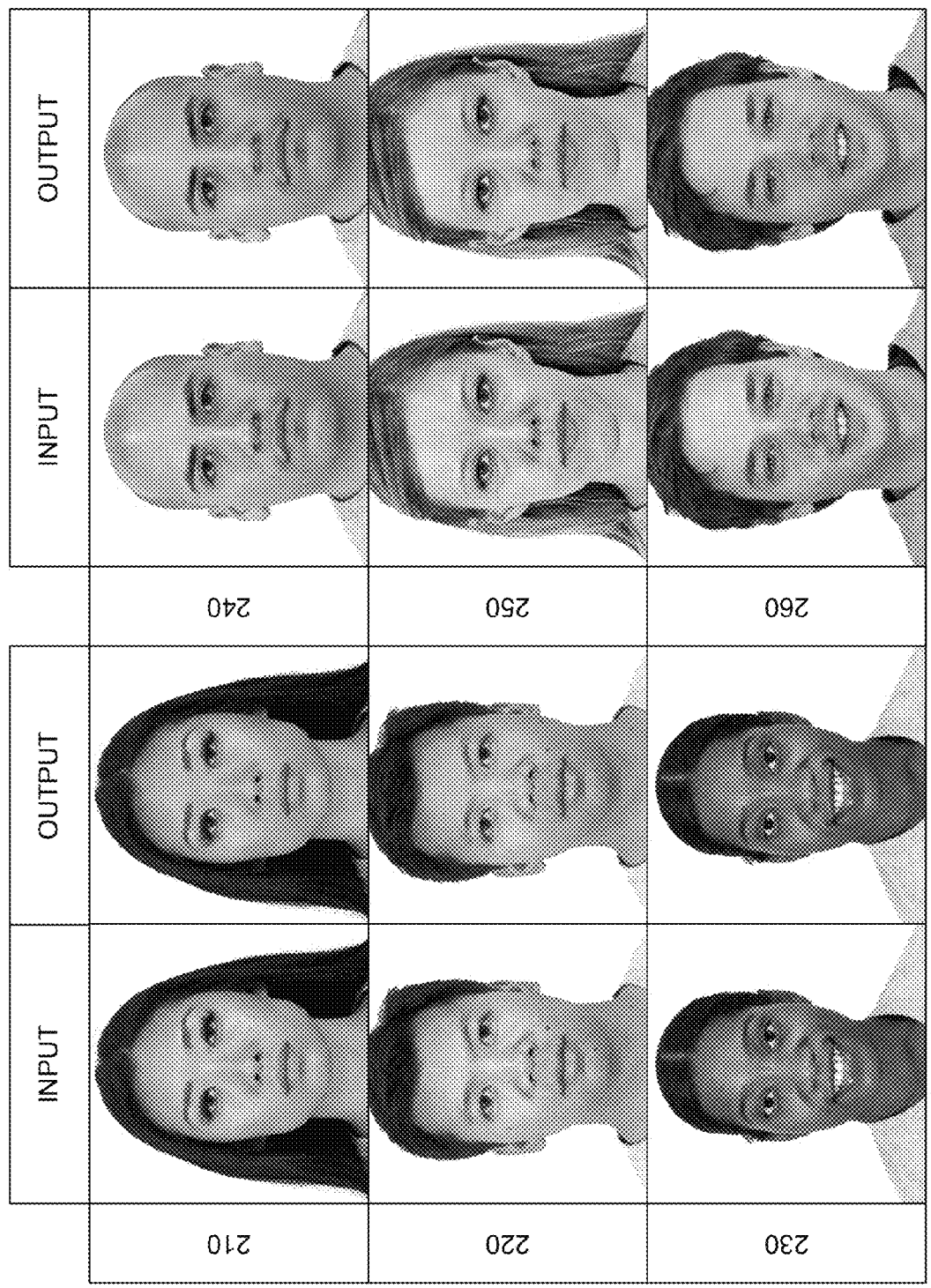
FIG. 2 depicts examples of retouched photo pairs before and after automatic retouching using an automatic retouching tool, in accordance with embodiments of the present invention.

Turning now to FIG. 2, FIG. 2 depicts examples of retouched photo pairs before and after automatic retouching using an automatic retouching tool. Each of retouched photo pairs 210, 220, 230, 240, 250, 260 depicts an original input photo and a corresponding automatically retouched output photo using techniques disclosed herein. For example, the retouched photo of pair 210 automatically smoothed the subject's skin and removed freckles from the subject's face. The retouched photo of pair 220 automatically smoothed the subject's skin and removed freckles and wrinkles from the subject's face, while preserving certain moles and stubble. The retouched photo of pair 230 automatically smoothed the subject's skin, removed freckles from the subject's face and reduced the oily appearance of the subject's skin. The retouched photo of pair 240 automatically smoothed the subject's skin, removed blemishes and freckles from the subject's face, while preserving the subject's facial hair. The retouched photo of pair 250 automatically smoothed the subject's skin and removed blemishes from the subject's face. The retouched photo of pair 260 automatically smoothed the subject's skin and removed blemishes from the subject's face, while preserving stubble. As such, the examples depicted in FIG. 2 illustrate a variety of possible results using techniques disclosed herein.

Returning now to FIG. 1, although automatic retouching tool 100 is depicted in FIG. 1 as including face parser 105, skin filter 110, frequency separator 115, skin quality detection network 120, high frequency path 125, low frequency path 155, and combiner 175, in various embodiments, automatic retouching tool 100 need not include all of these components. Moreover, the components of automatic retouching tool 100 need not reside in the same physical location. Likewise, other variations of an automatic retouching tool are contemplated. For example, instead of tailoring the tool to automatically retouch the face of a subject in portrait, an automatic retouching tool can be trained to retouch the face of a subject in other styles of photographs. Moreover although the terms "photograph" and "photo" are utilized herein, embodiments are contemplated that automatically retouch any type of image, whether or not the image can be classified as a photograph. More generally, an automatic retouching tool can be tailored to perform any type of image retouching, for example, in industries such as fashion, photography, graphic design, movies, advertising, marketing, and the like.

As such, using techniques disclosed herein, a user can efficiently and effectively retouch a designated photo automatically. For example, techniques disclosed herein can automatically detect blemishes, preserve skin detail, and avoid over-smoothing, compared with conventional systems for automatically retouching a photograph. Moreover, the present automatic retouching techniques reduce the computation time when compared to the time it takes conventional systems to accomplish lesser results. Accordingly, the disclosed techniques can provide creative professionals and casual users alike with a new, automated retouching tool that produces professional quality results significantly faster than conventional editing tools.

Exemplary Flow Diagram

Figure 3:
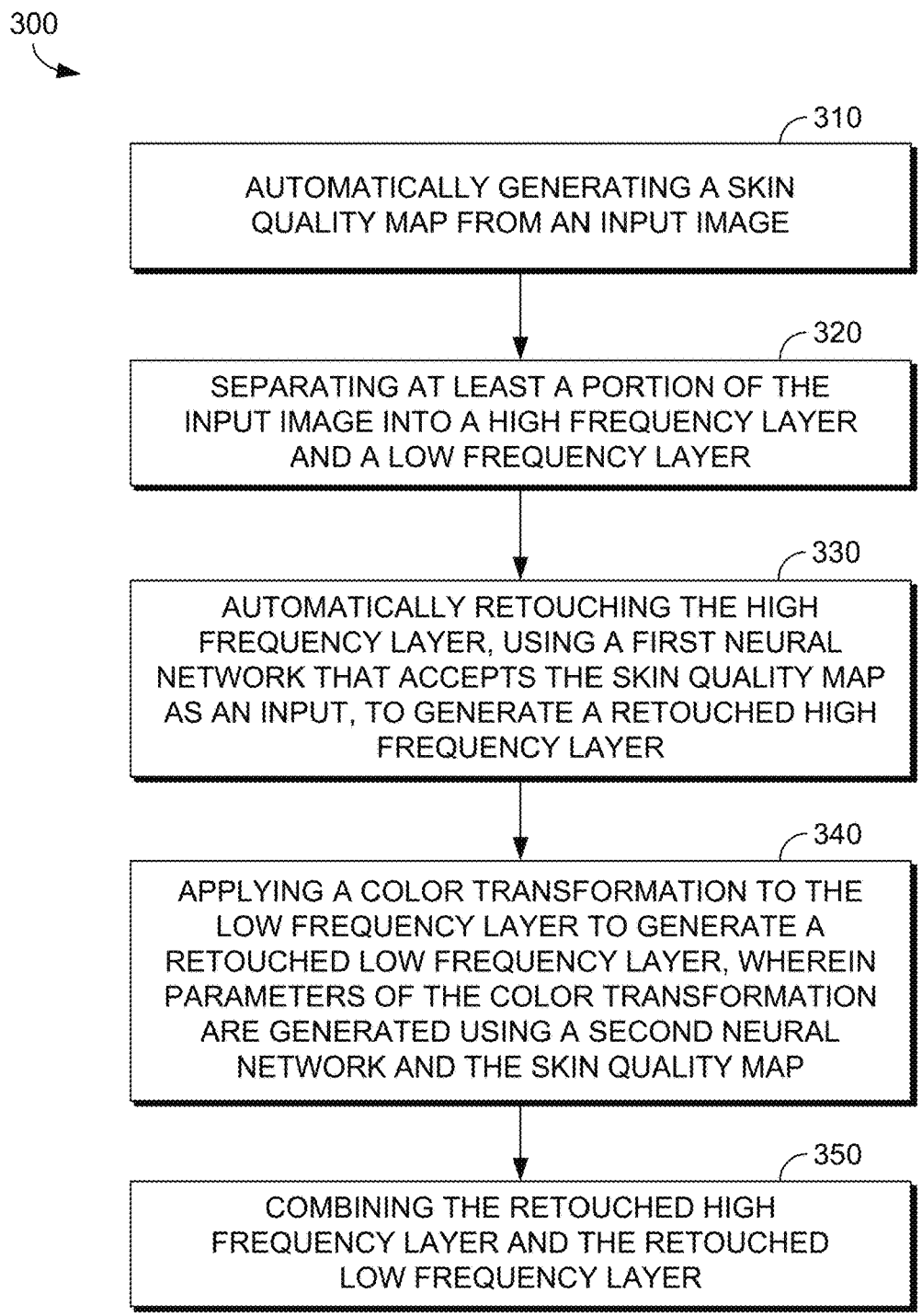
FIG. 3 is a flow diagram showing a method for automatically retouching an input image, in accordance with embodiments of the present invention.

With reference now to FIG. 3, a flow diagram is provided illustrating a method for automatically retouching an input image. Each block of the method 300 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning now to FIG. 3, FIG. 3 illustrates a method 300 for automatically retouching an input image, in accordance with embodiments described herein. Initially at block 310, a skin quality map is automatically generated from an input image. For example, a neural network such as a convolutional neural network can be trained to generate the skin quality map. The skin quality map can be a probability map comprising a probability for each analyzed region of the input image that the analyzed region needs retouching. This skin quality map is fed into inputs of separate high and low frequency paths. At block 320, at least a portion of the input image is separated into at a high frequency layer and a low frequency layer. At block 330, the high frequency layer is automatically retouched, using a first neural network that accepts the skin quality map as an input, to generate a retouched high frequency layer. At block 340, the low frequency layer is automatically retouched, to generate a retouched low frequency layer, wherein parameters of the color transformation are generated using a second neural network and the skin quality map. At block 350, the retouched high frequency layer and the retouched low frequency layer are combined to generate a combined retouched image.

Exemplary Computing Environment

Figure 4:
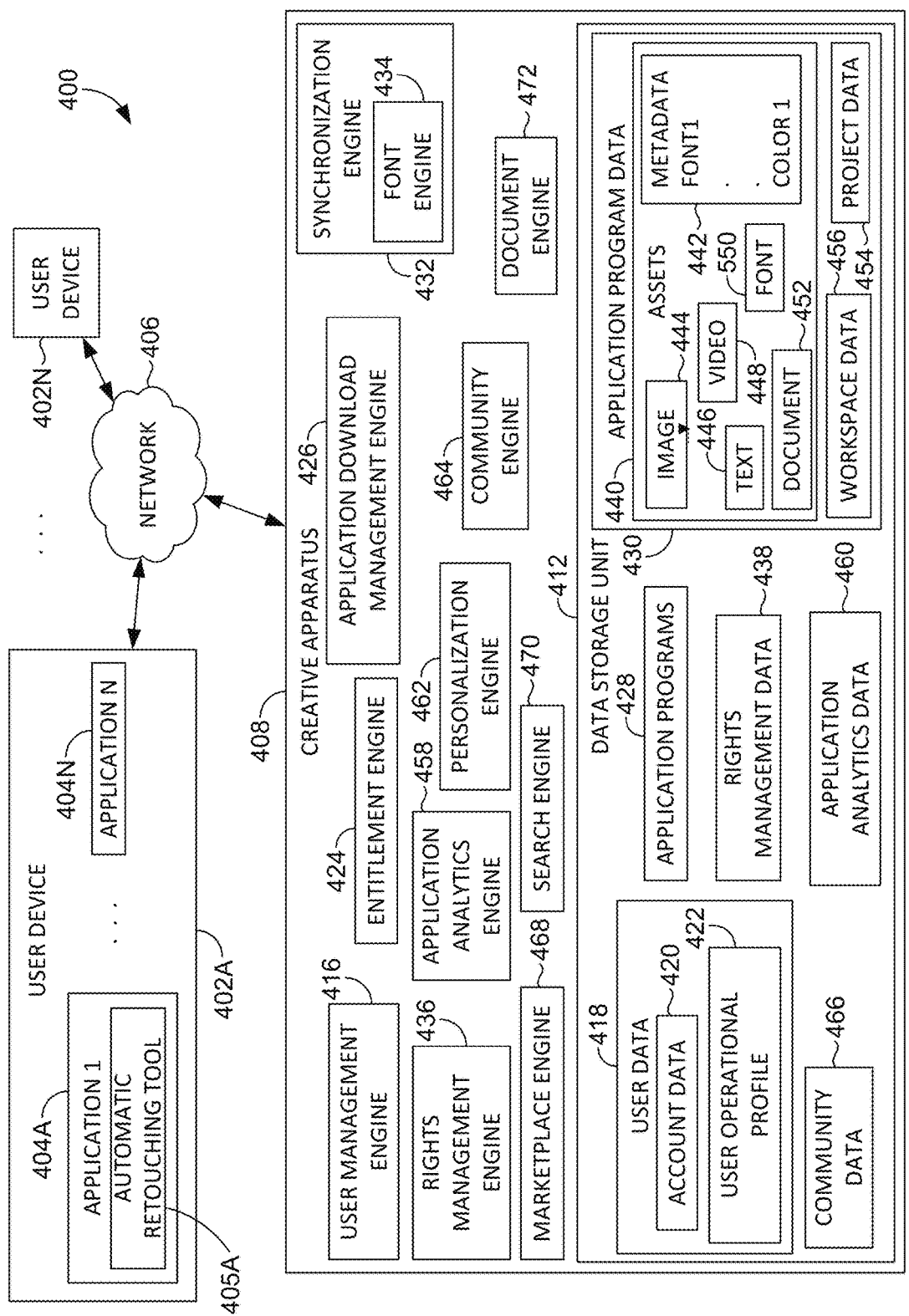
FIG. 4 is a block diagram of an exemplary computing environment in which embodiments of the invention may be employed.

FIG. 4 is a diagram of environment 400 in which one or more embodiments of the present disclosure can be practiced. Environment 400 includes one or more user devices, such as user devices 402A-402N. Examples of user devices include, but are not limited to, a personal computer (PC), tablet computer, a desktop computer, cellular telephone, a processing unit, any combination of these devices, or any other suitable device having one or more processors. Each user device includes at least one application supported by creative apparatus 408. It is to be appreciated that following description may generally refer to user device 402A as an example and any other user device can be used.

A user of the user device can utilize various products, applications, or services supported by creative apparatus 408 via network 406. User devices 402A-402N can be operated by various users. Examples of the users include, but are not limited to, creative professionals or hobbyists who use creative tools to generate, edit, track, or manage creative content, advertisers, publishers, developers, content owners, content managers, content creators, content viewers, content consumers, designers, editors, any combination of these users, or any other user who uses digital tools to create, edit, track, or manage digital experiences.

A digital tool, as described herein, includes a tool that is used for performing a function or a workflow electronically. Examples of a digital tool include, but are not limited to, content creation tool, content editing tool, content publishing tool, content tracking tool, content managing tool, content printing tool, content consumption tool, any combination of these tools, or any other tool that can be used for creating, editing, managing, generating, tracking, consuming or performing any other function or workflow related to content. A digital tool includes creative apparatus 408.

Digital experience, as described herein, includes experience that can be consumed through an electronic device. Examples of the digital experience include content creating, content editing, content tracking, content publishing, content posting, content printing, content managing, content viewing, content consuming, any combination of these experiences, or any other workflow or function that can be performed related to content.

Content, as described herein, includes electronic content. Examples of the content include, but are not limited to, image, video, website, webpage, user interface, menu item, tool menu, magazine, slideshow, animation, social post, comment, blog, data feed, audio, advertisement, vector graphic, bitmap, document, any combination of one or more content, or any other electronic content.

User devices 402A-402N can be connected to creative apparatus 408 via network 406. Examples of network 406 include, but are not limited to, internet, local area network (LAN), wireless area network, wired area network, wide area network, and the like.

Creative apparatus 408 includes one or more engines for providing one or more digital experiences to the user. Creative apparatus 408 can be implemented using one or more servers, one or more platforms with corresponding application programming interfaces, cloud infrastructure and the like. In addition, each engine can also be implemented using one or more servers, one or more platforms with corresponding application programming interfaces, cloud infrastructure and the like. Creative apparatus 408 also includes data storage unit 412. Data storage unit 412 can be implemented as one or more databases or one or more data servers. Data storage unit 412 includes data that is used by the engines of creative apparatus 408.

A user of user device 402A visits a webpage or an application store to explore applications supported by creative apparatus 408. Creative apparatus 408 provides the applications as a software as a service (SaaS), or as a standalone application that can be installed on user device 402A, or as a combination. The user can create an account with creative apparatus 408 by providing user details and also by creating login details. Alternatively, creative apparatus 408 can automatically create login details for the user in response to receipt of the user details. In some embodiments, the user is also prompted to install an application manager. The application manager enables the user to manage installation of various applications supported by creative apparatus 408 and also to manage other functionalities, such as updates, subscription account and the like, associated with the applications. User details are received by user management engine 416 and stored as user data 418 in data storage unit 412. In some embodiments, user data 418 further includes account data 420 under which the user details are stored.

The user can either opt for a trial account or can make payment based on type of account or subscription chosen by the user. Alternatively, the payment can be based on product or number of products chosen by the user. Based on payment details of the user, user operational profile 422 is generated by entitlement engine 424. User operational profile 422 is stored in data storage unit 412 and indicates entitlement of the user to various products or services. User operational profile 422 also indicates type of user, i.e. free, trial, student, discounted, or paid.

In some embodiment, user management engine 416 and entitlement engine 424 can be one single engine performing the functionalities of both the engines.

The user can then install various applications supported by creative apparatus 408 via an application download management engine 426. Application installers or application programs 428 present in data storage unit 412 are fetched by application download management engine 426 and made available to the user directly or via the application manager. In one embodiment, an indication of all application programs 428 are fetched and provided to the user via an interface of the application manager. In another embodiment, an indication of application programs 428 for which the user is eligible based on user's operational profile are displayed to the user. The user then selects application programs 428 or the applications that the user wants to download. Application programs 428 are then downloaded on user device 402A by the application manager via the application download management engine 426. Corresponding data regarding the download is also updated in user operational profile 422. Application program 428 is an example of the digital tool. Application download management engine 426 also manages the process of providing updates to user device 402A.

Upon download, installation and launching of an application program, in one embodiment, the user is asked to provide the login details. A check is again made by user management engine 416 and entitlement engine 424 to ensure that the user is entitled to use the application program. In another embodiment, direct access is provided to the application program as the user is already logged into the application manager.

The user uses one or more application programs 404A-404N installed on the user device to create one or more projects or assets. In addition, the user also has a workspace within each application program. The workspace, as described herein, includes setting of the application program, setting of tools or setting of user interface provided by the application program, and any other setting or properties specific to the application program. Each user can have a workspace. The workspace, the projects, and/or the assets can be stored as application program data 430 in data storage unit 412 by synchronization engine 432. Alternatively or additionally, such data can be stored at the user device, such as user device 402A.

Application program data 430 includes one or more assets 440. Assets 440 can be a shared asset which the user wants to share with other users or which the user wants to offer on a marketplace. Assets 440 can also be shared across multiple application programs 428. Each asset includes metadata 442. Examples of metadata 442 include, but are not limited to, font, color, size, shape, coordinate, a combination of any of these, and the like. In addition, in one embodiment, each asset also includes a file. Examples of the file include, but are not limited to, image 444, text 446, video 448, font 450, document 452, a combination of any of these, and the like. In another embodiment, an asset only includes metadata 442.

Application program data 430 also include project data 454 and workspace data 456. In one embodiment, project data 454 includes assets 440. In another embodiment, assets 440 are standalone assets. Similarly, workspace data 456 can be part of project data 454 in one embodiment while it may be standalone data in other embodiment.

A user can operate one or more user device to access data. In this regard, application program data 430 is accessible by a user from any device, including a device which was not used to create assets 440. This is achieved by synchronization engine 432 that stores application program data 430 in data storage unit 412 and enables application program data 430 to be available for access by the user or other users via any device. Before accessing application program data 430 by the user from any other device or by any other user, the user or the other user may need to provide login details for authentication if not already logged in. In some cases, if the user or the other user are logged in, then a newly created asset or updates to application program data 430 are provided in real time. Rights management engine 436 is also called to determine whether the newly created asset or the updates can be provided to the other user or not. Workspace data 456 enables synchronization engine 432 to provide a same workspace configuration to the user on any other device or to the other user based on rights management data 438.

In various embodiments, various types of synchronization can be achieved. For example, the user can pick a font or a color from user device 402A using a first application program and can use the font or the color in a second application program on any other device. If the user shares the font or the color with other users, then the other users can also use the font or the color. Such synchronization generally happens in real time. Similarly, synchronization of any type of application program data 430 can be performed.

In some embodiments, user interaction with applications 404 is tracked by application analytics engine 458 and stored as application analytics data 460. Application analytics data 460 includes, for example, usage of a tool, usage of a feature, usage of a workflow, usage of assets 440, and the like. Application analytics data 460 can include the usage data on a per user basis and can also include the usage data on a per tool basis or per feature basis or per workflow basis or any other basis. Application analytics engine 458 embeds a piece of code in applications 404 that enables the application to collect the usage data and send it to application analytics engine 458. Application analytics engine 458 stores the usage data as application analytics data 460 and processes application analytics data 460 to draw meaningful output. For example, application analytics engine 458 can draw an output that the user uses "Tool 4" a maximum number of times. The output of application analytics engine 458 is used by personalization engine 462 to personalize a tool menu for the user to show "Tool 4" on top. Other types of personalization can also be performed based on application analytics data 460. In addition, personalization engine 462 can also use workspace data 456 or user data 418 including user preferences to personalize one or more application programs 428 for the user.

In some embodiments, application analytics data 460 includes data indicating status of a project of the user. For example, if the user was preparing an article in a digital publishing application and what was left was publishing the prepared article at the time the user quit the digital publishing application, then application analytics engine 458 tracks the state. Now when the user next opens the digital publishing application on another device, then the user is indicated and the state and options are provided to the user for publishing using the digital publishing application or any other application. In addition, while preparing the article, a recommendation can also be made by synchronization engine 432 to incorporate some of other assets saved by the user and relevant for the article. Such a recommendation can be generated using one or more engines, as described herein.

Creative apparatus 408 also includes community engine 464 which enables creation of various communities and collaboration among the communities. A community, as described herein, includes a group of users that share at least one common interest. The community can be closed, i.e., limited to a number of users or can be open, i.e., anyone can participate. The community enables the users to share each other's work and comment or like each other's work. The work includes application program data 440. Community engine 464 stores any data corresponding to the community, such as work shared on the community and comments or likes received for the work as community data 466. Community data 466 also includes notification data and is used for notifying other users by the community engine in case of any activity related to the work or new work being shared. Community engine 464 works in conjunction with synchronization engine 432 to provide collaborative workflows to the user. For example, the user can create an image and can request for some expert opinion or expert editing. An expert user can then either edit the image as per the user liking or can provide expert opinion. The editing and providing of the expert opinion by the expert is enabled using community engine 464 and synchronization engine 432. In collaborative workflows, a plurality of users is assigned different tasks related to the work.

Creative apparatus 408 also includes marketplace engine 468 for providing marketplace to one or more users. Marketplace engine 468 enables the user to offer an asset for selling or using. Marketplace engine 468 has access to assets 440 that the user wants to offer on the marketplace. Creative apparatus 408 also includes search engine 470 to enable searching of assets 440 in the marketplace. Search engine 470 is also a part of one or more application programs 428 to enable the user to perform search for assets 440 or any other type of application program data 430. Search engine 470 can perform a search for an asset using metadata 442 or the file.

Creative apparatus 408 also includes document engine 472 for providing various document related workflows, including electronic or digital signature workflows, to the user. Document engine 472 can store documents as assets 440 in data storage unit 412 or can maintain a separate document repository (not shown in FIG. 4).

In accordance with embodiments of the present invention, application programs 428 include a photo retouching application that facilitates photo retouching, and, among other things, facilitates automatic retouching of photographs such as portraits, and more particularly, facilitates automatic retouching of the subject's skin. In these embodiments, the photo retouching application is provided to user device 402A (e.g., as application 404N) such that the photo retouching application operates via the user device. In another embodiment, an automatic retouching tool (e.g., automatic retouching tool 405A) is provided as an add-on or plug-in to an application such as a photo retouching application, as further described with reference to FIG. 1 above. These configurations are merely exemplary, and other variations for providing automatic photo retouching software functionality are contemplated within the present disclosure.

It is to be appreciated that the engines and working of the engines are described as examples herein, and the engines can be used for performing any step in providing digital experience to the user.

Exemplary Operating Environment

Figure 5:
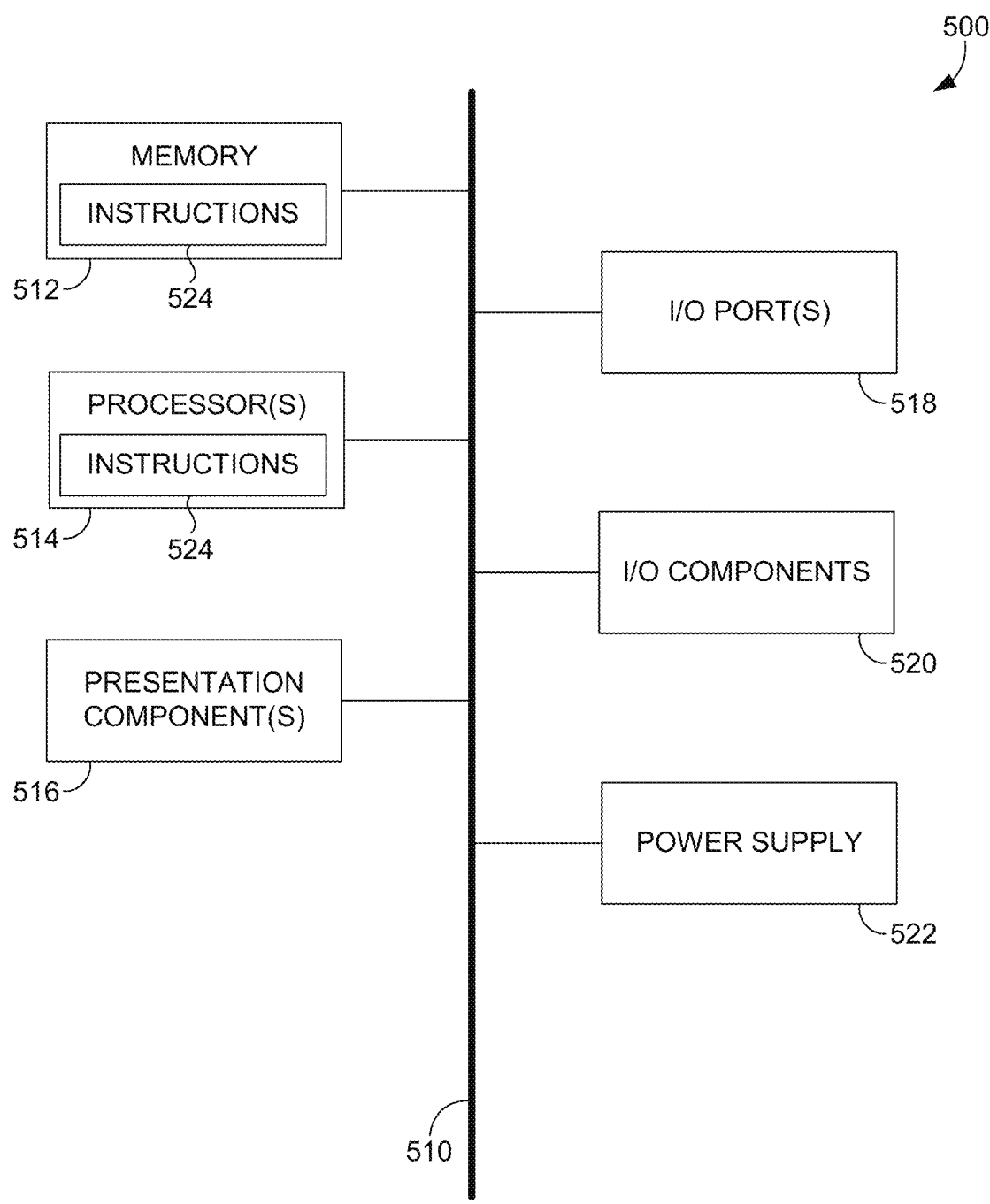
FIG. 5 is a block diagram of an exemplary computing environment suitable for use in implementing embodiments of the present invention.

Having described an overview of embodiments of the present invention, an exemplary operating environment in which embodiments of the present invention may be implemented is described below in order to provide a general context for various aspects of the present invention. Referring now to FIG. 5 in particular, an exemplary operating environment for implementing embodiments of the present invention is shown and designated generally as computing device 500. Computing device 500 is but one example of a suitable computing environment and is not intended to suggest any limitation as to the scope of use or functionality of the invention. Neither should computing device 500 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 516, input/output (I/O) ports 518, input/output components 520, and illustrative power supply 522. Bus 510 represents what may be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 5 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer-storage media in the form of volatile and/or nonvolatile memory. The memory may be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which may be built in. Illustrative components include a microphone, joystick, game pad, satellite dish, scanner, printer, wireless device, etc. The I/O components 520 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 500. Computing device 500 may be equipped with depth cameras, such as stereoscopic camera systems, infrared camera systems, RGB camera systems, touchscreen technology, and combinations of these, for gesture detection and recognition. Additionally, the computing device 500 may be equipped with accelerometers or gyroscopes that enable detection of motion. The output of the accelerometers or gyroscopes may be provided to the display of computing device 500 to render immersive augmented reality or virtual reality.

Embodiments described herein support automatic retouching of photographs such as portraits, and more particularly, automatic retouching of the subject's skin. The components described herein refer to integrated components of an automatic photo retouching system. The integrated components refer to the hardware architecture and software framework that support functionality using the automatic photo retouching system. The hardware architecture refers to physical components and interrelationships thereof and the software framework refers to software providing functionality that can be implemented with hardware embodied on a device.

The end-to-end software-based automatic photo retouching system can operate within the automatic photo retouching system components to operate computer hardware to provide automatic photo retouching system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the automatic photo retouching system components can manage resources and provide services for the automatic photo retouching system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more non-transitory computer storage media storing computer-useable instructions that, when used by one or more computing devices, cause the one or more computing devices to perform operations comprising:
    automatically generating a skin quality map from a skin mask of an input image, wherein the skin mask identifies regions of skin in the input image, and wherein the skin quality map is a probability map comprising a probability for each analyzed region that the analyzed region needs retouching;
    separating the skin mask into a high frequency layer and a low frequency layer;
    providing the skin quality map as an input into a first neural network configured to perform texture synthesis on the high frequency layer to generate a retouched high frequency layer;
    applying a color transformation to the low frequency layer to generate a retouched low frequency layer, wherein parameters of the color transformation are generated using a second neural network and upsampled using the skin quality map; and
    combining the retouched high frequency layer and the retouched low frequency layer.

2. The non-transitory media of claim 1, wherein the skin mask is generated by removing non-skin regions from the input image, leaving only the regions of skin.

3. The non-transitory media of claim 1, wherein the skin quality map is generated using a neural network trained using the same training set as the first neural network.

4. The non-transitory media of claim 1, wherein the first neural network is a conditional generative adversarial network comprising a dilated residual network.

5. The non-transitory media of claim 1, wherein the first neural network operates on patches of the high frequency layer.

6. The non-transitory media of claim 1, wherein the operations additionally comprise enhancing a training set for at least one of the first or second neural networks.

7. The non-transitory media of claim 6, wherein enhancing the training set comprises applying a modification to an original image from the training set before training.

8. The non-transitory media of claim 7, wherein the modification comprises applying relighting to the original image.

9. The non-transitory media of claim 7, wherein the modification comprises applying synthetic blemishes to the original image.

10. The non-transitory media of claim 7, wherein the modification comprises applying palette-based photo recoloring to the original image.

11. A computerized method for automatically retouching an input image, the method comprising:
    automatically generating a skin quality map from a skin mask of an input image, wherein the skin mask identifies regions of skin in the input image, and wherein the skin quality map is a probability map comprising a probability for each analyzed region that the analyzed region needs retouching;
    separating the skin mask into a high frequency layer and a low frequency layer;
    providing the skin quality map as an input into a first neural network configured to perform texture synthesis on the high frequency layer to generate a retouched high frequency layer;
    applying a color transformation to the low frequency layer to generate a retouched low frequency layer, wherein parameters of the color transformation are generated using a second neural network and upsampled using the image quality map; and
    combining the retouched high frequency layer and the retouched low frequency layer.

12. The method of claim 11, wherein the first neural network is a conditional generative adversarial network.

13. The method of claim 11, wherein the first neural network operates on patches of the high frequency layer.

14. The method of claim 11, wherein the method additionally comprises enhancing a training set for at least one of the first or second neural networks by applying a modification to an original image from the training set before training.

15. The method of claim 14, wherein the modification comprises at least one of applying relighting to the original image, applying synthetic blemishes to the original image, or applying palette-based photo recoloring to the original image.

16. A computer system comprising:
    one or more hardware processors and memory configured to provide computer program instructions to the one or more hardware processors;
    a skin quality detection network configured to generate a skin quality map from a skin mask of an input image, wherein the skin mask identifies regions of skin in the input image, and wherein the skin quality map is a probability map comprising a probability for each analyzed region that the analyzed region needs retouching;
    a frequency separator configured to separate the skin mask into a high frequency layer and a low frequency layer;
    a means for performing texture synthesis on the high frequency layer by providing the skin quality map as an input into a first neural network configured to generate a retouched high frequency layer;
    a means for applying a color transformation to the low frequency layer to generate a retouched low frequency layer using parameters of the color transformation generated using a second neural network and upsampled using the skin quality map; and
    a combiner configured to reconstitute the retouched high frequency layer and the retouched low frequency layer.

17. The computer system of claim 16, wherein the first neural network is a conditional generative adversarial network comprising a dilated residual network.

18. The computer system of claim 16, wherein the first neural network operates on patches of the high frequency layer.

19. The computer system of claim 16, at least one of the first or second neural networks being trained by a training set, the training set being enhanced by a modification to an original image from the training set before training.

20. The computer system of claim 19, wherein the modification comprises at least one of an application of relighting to the original image, an application of synthetic blemishes to the original image, or an application of palette-based photo recoloring to the original image.

* * * * *